United States Patent
Wiegemann et al.

(10) Patent No.: US 10,669,928 B2
(45) Date of Patent: Jun. 2, 2020

(54) COOLING DEVICE AND MOTOR VEHICLE WITH A COOLING DEVICE

(71) Applicant: Continental Automotive GmbH, Hannover (DE)

(72) Inventors: Sven-Eric Wiegemann, Regensburg (DE); Lena Ebner, Regensburg (DE); Tobias Dausch, Regensburg (DE); Thomas Grossner, Regensburg (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 126 days.

(21) Appl. No.: 16/001,185

(22) Filed: Jun. 6, 2018

(65) Prior Publication Data
US 2018/0347454 A1 Dec. 6, 2018

(30) Foreign Application Priority Data
Jun. 6, 2017 (DE) .................. 10 2017 209 484

(51) Int. Cl.
| | | |
|---|---|---|
| *F02B 39/00* | (2006.01) | |
| *F01M 5/00* | (2006.01) | |
| *B60K 11/02* | (2006.01) | |
| *F02B 37/00* | (2006.01) | |
| *F01M 11/00* | (2006.01) | |
| *F01M 5/02* | (2006.01) | |
| *F01M 11/02* | (2006.01) | |

(52) U.S. Cl.
CPC ............ *F02B 39/005* (2013.01); *B60K 11/02* (2013.01); *F01M 5/001* (2013.01); *F01M 5/021* (2013.01); *F01M 11/0004* (2013.01); *F02B 37/00* (2013.01); *F01M 2011/0025* (2013.01); *F01M 2011/021* (2013.01)

(58) Field of Classification Search
CPC .... B60K 11/02; F01M 11/0004; F01M 5/001; F01M 5/021; F01M 2011/0025; F01M 2011/021; F01P 11/08; F01P 11/20; F01P 3/12; F01P 3/20; F01P 7/14; F01P 2007/146; F02B 37/00; F02B 39/005; F16H 57/0413; F16H 57/0417
See application file for complete search history.

(56) References Cited

U.S. PATENT DOCUMENTS 8,616,187 B2 12/2013 Yamazaki et al. ....... 123/568.12
9,689,288 B2 6/2017 Zahdeh
(Continued)

FOREIGN PATENT DOCUMENTS

DE 102014117421 A1 3/1916 ............. F01M 5/02
DE 102016102270 A1 8/1916 ............. F01M 11/00
(Continued)

OTHER PUBLICATIONS

German Office Action, Application No. 102017209484.2, 7 pages, dated Feb. 6, 2018.

*Primary Examiner* — Brandon D Lee
(74) *Attorney, Agent, or Firm* — Slayden Grubert Beard PLLC

(57) ABSTRACT

A cooling device for a motor vehicle may include: a liquid-cooled turbocharger arranged on an internal combustion engine; a coolant feed line; a coolant discharge line; and a heat exchanger arranged at least partially within an oil container. The coolant discharge line is connected by an oil preheating line to the heat exchanger.

8 Claims, 4 Drawing Sheets

(56) References Cited

U.S. PATENT DOCUMENTS

2016/0245134 A1* 8/2016 Zahdeh ............. F01M 11/0004
2017/0356327 A1* 12/2017 Gonze ................. F01P 7/16

FOREIGN PATENT DOCUMENTS

| DE | 102017112321 A1 | 12/1917 | ............... F01M 5/02 |
| DE | 102008008585 A1 | 8/2009 | ............. F01P 11/08 |
| DE | 102008021263 A1 | 11/2009 | ............... F01P 3/12 |
| DE | 102009017748 A1 | 10/2010 | ............... F01M 5/00 |
| DE | 102009060340 A1 | 6/2011 | ............. F01M 11/00 |
| DE | 102011053591 A1 | 3/2012 | ............... F01M 5/02 |
| DE | 202015100468 U1 | 2/2015 | ................ B60S 1/46 |

* cited by examiner

COOLING DEVICE AND MOTOR VEHICLE WITH A COOLING DEVICE

CROSS-REFERENCE TO RELATED APPLICATIONS

This application claims priority to DE Application No. 10 2017 209 484.2 filed Jun. 6, 2017, the contents of which are hereby incorporated by reference in their entirety.

TECHNICAL FIELD

The present disclosure relates to cooling devices. Some embodiments of the teachings herein may include cooling devices for a motor vehicle.

BACKGROUND

Many internal combustion engines include a turbocharger to achieve improvements in consumption, emissions, and/or power. The exhaust gas from the engine flows through a turbine, which drives a compressor and thus forces more air into the combustion chamber. The turbocharger is usually arranged in direct proximity to the engine, downstream of the exhaust manifold. The turbine blades, in particular, as well as the turbine housing, are exposed to particularly high temperatures by the hot exhaust gas flowing through. Two common methods are used for ensuring the durability of the turbocharger over the service life.

In the first method, the turbine housing is produced from high-strength high-temperature steel and the housing is cooled by selective air routing in the engine compartment. The waste heat from the turbocharger is dissipated into the environment.

In the second method, the turbine housing is produced from aluminum and is cooled selectively by means of a water cooling jacket. The cooling liquid is diverted from the cooling circuit of the engine and the heated coolant is fed back into the cooling circuit after flowing through the turbine housing. The waste heat from the turbocharger thus contributes to faster heating of the coolant of the engine after cold starting.

SUMMARY

The teachings of the present disclosure may be embodied in a liquid-cooled turbocharger. For example, in some embodiments, a turbocharger includes a coolant feed line and a coolant discharge line, in which liquid coolant is fed to a turbocharger of the motor vehicle and is heated in the turbocharger, and the heated coolant is discharged from the turbocharger via the coolant discharge line.

For example, some embodiments include a cooling device (2) for a motor vehicle (1) having a coolant feed line (16) and a coolant discharge line (17) of a liquid-cooled turbocharger (4) arranged on an internal combustion engine (3) of the motor vehicle (1), characterized in that the coolant discharge line (17) is connected by an oil preheating line (18) to at least one heat exchanger unit (19, 28) arranged at least partially in an oil container (6, 7).

In some embodiments, the heat exchanger unit includes a first heat exchanger unit (19), and the oil container includes an engine oil container (6), wherein the engine oil container (6) is arranged on the internal combustion engine (3).

In some embodiments, the heat exchanger unit includes a second heat exchanger unit (28), and the oil container includes a transmission oil container (7), wherein the transmission oil container (7) is arranged on a vehicle transmission (5) of the motor vehicle (1).

In some embodiments, the oil preheating line (18) is connected directly to the coolant discharge line (17) by a first valve outlet (22) of a controllable discharge valve (21), and the coolant discharge line (17) is connected directly to an engine cooling line (20) of the internal combustion engine (3) by a second valve outlet (23) of the discharge valve (21).

In some embodiments, a first valve outlet (25) of a feed valve (24) is connected directly to the coolant feed line (16), and a second valve outlet (26) of the feed valve (24) is connected directly to a turbocharger bypass line (27), which is connected to the heat exchanger unit (19, 28).

In some embodiments, the heat exchanger unit (28) is connected to the oil preheating line (18) by means of a control valve (29) designed to control a flow rate of a coolant (18) flowing through the oil preheating line (18).

As another example, some embodiments include a motor vehicle (1) having a cooling device (2) as described above.

As another example, some embodiments include a method for operating a cooling device (2) for a motor vehicle (1), in which liquid coolant (10) is fed to a turbocharger (4) of the motor vehicle (1) via a coolant feed line (16) and is heated in the turbocharger (4), and the heated coolant (10) is discharged from the turbocharger (4) via a coolant discharge line (17), characterized in that the coolant (10) is passed at least in part to at least one heat exchanger unit (19, 28) by the coolant discharge line (17), and thermal energy is exchanged between the coolant (10) and at least one oil (8, 9) in at least one oil container (6, 7) of the motor vehicle (1).

In some embodiments, a current oil temperature value (30) of the oil (8, 9) in the oil container (6, 7) is determined, and a discharge valve (21) arranged between the coolant discharge line (17) and an oil preheating line (18) is controlled in accordance with the oil temperature value (30) in order to regulate an oil quantity flowing through the discharge valve (21).

In some embodiments, a current oil temperature value (30) of the oil (8, 9) in the oil container (6, 7) is determined, and a feed valve (24) arranged ahead of the coolant feed line (16) is controlled in accordance with the oil temperature value (30), and the coolant (10) is passed by the feed valve (24) at least in part through a turbocharger bypass line (27) connected directly to the heat exchanger unit (19, 28) if the oil temperature value (30) is higher than an oil temperature limit value.

BRIEF DESCRIPTION OF THE DRAWINGS

Exemplary embodiments are explained in more detail below on the basis of schematic drawings.

In the drawings.

In the figures, identical or functionally identical elements are provided with identical reference signs.

DETAILED DESCRIPTION

Figure 1:
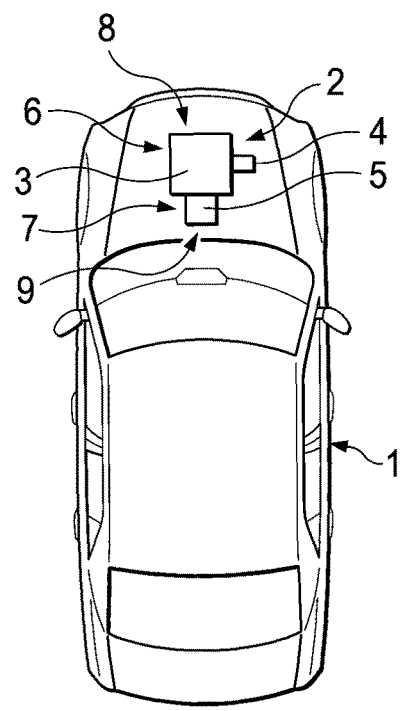
FIG. 1 shows a schematic plan view of an embodiment of a motor vehicle with a cooling device according to the teachings of the present disclosure.

According to the teachings of the present disclosure, some embodiments include a cooling device with a coolant feed line and a coolant discharge line. A turbocharger is arranged on an internal combustion engine of the motor vehicle. In some embodiments, the coolant discharge line is connected by an oil preheating line to at least one heat exchanger unit arranged at least partially in an oil container. Waste heat from the turbocharger contained in the coolant in the coolant discharge line can be used in an effective way to warm up or preheat oil in the oil container.

Cold starting an engine results in higher fuel consumption than warm starting. Among the reasons for this is the viscosity of the engine and transmission oil. In contrast to warm oil, cold, viscous oil requires more power to enable it to be moved in the oil circuit. Increasing the temperature of the oil lowers the resistance of the oil to flow within the oil circuit.

By means of the cooling device, the oil in the oil container may be warmed up more quickly. This is made possible by passing the coolant heated by the turbocharger to the heat exchanger unit via the oil preheating line. By means of the heat exchanger unit, thermal energy is then exchanged between the coolant and the oil. In particular, a significant proportion of the thermal energy of the coolant is released by the coolant to the oil in the oil container.

In some embodiments, via the coolant feed line, the coolant is fed to the turbocharger. In the turbocharger, the coolant absorbs at least some of the waste heat of the turbocharger and is carried away from the turbocharger by the coolant discharge line. During the time in the turbocharger, the coolant can flow through a housing of the turbocharger, in particular in any way desired. The coolant can be in the form of cooling water or of many different types of liquid for thermal energy absorption.

By means of the oil preheating line, a direct connection is created between the coolant discharge line connected to the turbocharger and the heat exchanger unit. Thus, the coolant can be passed directly and selectively to the heat exchanger unit. By means of the oil preheating line, the coolant is passed to the oil or to the heat exchanger unit, in particular directly and without detours. This thermal energy of the coolant can be released to the oil as early as possible and without the detour via other components of the motor vehicle.

In some embodiments, the heat exchanger unit is arranged in an oil present in the oil container, in particular in such a way that the heat exchanger unit is surrounded by the oil. The heat exchanger unit is furthermore designed in such a way that a considerable part of the thermal energy that the coolant has acquired from the turbocharger can be released to the oil. Thus, the heat exchanger unit has fins, for example, to make the effective area between the coolant and the oil as large as possible. The heat exchanger unit may comprise an oil/coolant heat exchanger.

In some embodiments, the oil container comprises all the components that carry the oil, e.g. an oil filter. Thus, the heat exchanger unit can also be arranged on an oil filter, for example, possibly being integrated into the oil filter. The heat exchanger unit may be arranged at a location of the oil container at which the oil temperature is relatively low in comparison with other locations of the oil container. In some embodiments, the heat exchanger unit dips at least partially into the oil.

In some embodiments, the heat exchanger unit comprises a first heat exchanger unit, and for the oil container comprises an engine oil container, wherein the engine oil container is arranged on the internal combustion engine. The first heat exchanger unit may be an engine oil heat exchanger unit. By means of the first heat exchanger unit, the transfer of thermal energy from the coolant to the oil of the engine oil container is made possible. In some embodiments, the oil in the engine oil container is in the form of engine oil and is designed for use in the internal combustion engine.

In some embodiments, the heat exchanger unit comprises a second heat exchanger unit, and for the oil container comprises a transmission oil container, wherein the transmission oil container is arranged on a vehicle transmission of the motor vehicle. The second heat exchanger unit may be a transmission oil heat exchanger unit. Thus, the oil in the transmission oil container is transmission oil, which is designed for use in the vehicle transmission. By means of the second heat exchanger unit, the transmission oil or the oil in the transmission oil container is heated. The temperature of the transmission oil can thereby be raised more quickly when cold starting the motor vehicle.

In some embodiments, the oil preheating line may be connected directly to the coolant discharge line by a first valve outlet of a controllable discharge valve, and the coolant discharge line may be connected directly to an engine cooling line of the internal combustion engine by a second valve outlet of the discharge valve. By means of the discharge valve, it is thus possible to control what quantity of the coolant is passed via the oil preheating line to the heat exchanger unit and what quantity of the coolant is passed directly to the engine cooling line without the detour via the oil preheating line.

In some embodiments, the oil in the oil container has already reached at least the temperature of the coolant in the coolant discharge line. That is to say that the coolant in the coolant discharge line is cooler than the temperature of the oil in the oil container, for example. In this case, the discharge valve can then be controlled in such a way, for example, that the coolant is then only passed through the engine cooling line. In some embodiments, the discharge valve may be controlled in such a way that only a small coolant flow flows through the oil preheating line and overheating of the oil preheating line is thereby preferably prevented. The greater part of the coolant may then be passed through the engine cooling line.

In some embodiments, a first valve outlet of a feed valve may be connected directly to the coolant feed line, and for a second valve outlet of the feed valve may be connected directly to a turbocharger bypass line. The feed valve may be supplied with the cold coolant, i.e. the coolant after it has passed through a radiator of the motor vehicle and before it has been heated by the internal combustion engine and the turbocharger, for example. By means of the feed valve, at least some of the coolant that has not yet been heated can then be diverted to the turbocharger bypass line.

In some embodiments, the coolant which is passed through the turbocharger bypass line does not flow through the turbocharger but is made to bypass the turbocharger in such a way that little or no thermal energy of the turbocharger is released to the coolant. By means of the feed valve and the turbocharger bypass line, it is possible to pass cold or unheated coolant to the heat exchanger unit. The heat exchanger unit can thus also be used to cool the oil in the oil container. In some embodiments, the oil, in particular the engine oil and/or the transmission oil, becomes too hot during the operation of the motor vehicle and has to be cooled. For this purpose, the turbocharger bypass line may be connected directly to the heat exchanger unit. The cold coolant passed through the turbocharger bypass line can then absorb thermal energy from the oil in the oil container by means of the heat exchanger unit.

In some embodiments, the heat exchanger unit may be connected to the oil preheating line by means of a control valve designed to control a flow rate of a coolant flowing through the oil preheating line, in particular exclusively by means of said valve. By means of the control valve, the inflow of coolant to the second heat exchanger unit can be interrupted or, alternatively, the flow rate can at least be regulated. By means of the control valve, it is furthermore made possible, for example, for the first heat exchanger unit but not the second heat exchanger unit to be supplied with the heated coolant via the oil preheating line. It is thereby possible for the engine oil but not the transmission oil to be preheated, for example. However, there is also the possibility of heating the transmission oil but not the engine oil.

In some embodiments, a motor vehicle includes a cooling device as described above. Here, the motor vehicle comprises, in particular, an internal combustion engine and a liquid-cooled turbocharger arranged on the internal combustion engine. The motor vehicle furthermore comprises a vehicle transmission. The internal combustion engine can be operated with gasoline or diesel, for example, and with other fuels, such as mixtures with gasoline or diesel, CNG (compressed natural gas), LPG (liquefied petroleum gas) or synthetic fuels. The internal combustion engine may include an engine oil container. In some embodiments, the engine oil container has an oil sump and an oil filter, for example. The vehicle transmission has a transmission oil container and an oil filter, for example. The motor vehicle may include a passenger car but can also be a heavy goods vehicle or as some other commercial vehicle, for example.

Some embodiments include a method for operating a cooling device for a motor vehicle. Liquid coolant is fed to a turbocharger of the motor vehicle via a coolant feed line and is heated in the turbocharger. The heated coolant is discharged from the turbocharger via a coolant discharge line. In some embodiments, the coolant is passed at least in part to at least one heat exchanger unit, in particular a heat exchanger unit arranged in an oil container, in particular at least partially in an oil container, via the coolant discharge line, in particular via an oil preheating line, and thermal energy is exchanged between the coolant and at least one oil in at least one oil container of the motor vehicle. In some embodiments, the thermal energy is released by the coolant to the oil in the oil container during the exchange.

In some embodiments, a current oil temperature value of the oil in the oil container may be determined, and a discharge valve arranged between the coolant discharge line and an oil preheating line may be controlled in accordance with the oil temperature value in order to regulate an oil quantity flowing through the discharge valve. The current oil temperature value can be determined by means of a thermostat in the oil container, for example. The discharge valve is then controlled in such a way with reference to the oil temperature value, for example, that the coolant is passed to the heat exchanger unit if the oil temperature value is lower than a coolant temperature value. This prevents the coolant being heated by the oil. Thus, the oil can have a higher temperature than the coolant and heat the coolant in such a way that it changes to a gaseous state, for example. However, the discharge valve can also be controlled in such a way that only a small quantity of the coolant is passed through the oil preheating line in this case to prevent overheating of the oil preheating line.

In some embodiments, a current oil temperature value of the oil in the oil container may be determined, and a feed valve arranged ahead of the coolant feed line may be controlled in accordance with the oil temperature value, and the coolant may be passed by the feed valve at least in part through a turbocharger bypass line connected directly to the heat exchanger unit if the oil temperature value is higher than an oil temperature limit value. Thus, if it is ascertained, for example, that the oil temperature value exceeds the oil temperature limit value, the feed valve enables at least partially cool coolant, i.e. coolant which, after flowing through a radiator of the motor vehicle, has not yet flowed through the turbocharger, to be passed via the turbocharger bypass line, which is connected to the heat exchanger unit and thereby to cool the oil in the oil container or to absorb thermal energy from the oil in the oil container. The relevant components of the cooling device and of the motor vehicle are each designed to carry out the respective method steps.

Further features of the teachings herein emerge from the claims, the figures, and the description of the figures. The features and combinations of features mentioned in the description above and the features and combinations of features mentioned in the description of the figures below and/or shown in the figures alone can be used not only in the respectively stated combination, but also in other combinations or alone without departing from the scope of the teachings herein.

In FIG. 1, a schematic plan view of a motor vehicle 1 having a cooling device 2 is shown. The motor vehicle 1 comprises an internal combustion engine 3, a turbocharger 4, and a vehicle transmission 5. In some embodiments, the internal combustion engine 3 is a front-mounted engine but can also be a centrally mounted engine, rear-mounted engine, or in many other different ways. The internal combustion engine 3 may be a gasoline or diesel engine. The turbocharger 4 is arranged on the internal combustion engine 3. The turbocharger 4 is an exhaust turbocharger and is liquid-cooled. In some embodiments, the thermal energy which is stored in components of the turbocharger, in particular a housing of the turbocharger, is dissipated substantially by a liquid coolant or a cooling liquid designed as a coolant.

The internal combustion engine 3 has an engine oil container 6 and the vehicle transmission 5 has a transmission oil container 7. The engine oil container 6 may include an oil sump but can also comprise an oil filter. There is engine oil 8 in the engine oil container 6. The engine oil 8 is provided for the lubrication of the internal combustion engine 3. The transmission oil container 7 contains transmission oil 9. The transmission oil 9 is provided for the lubrication of the vehicle transmission 5.

Figure 2:
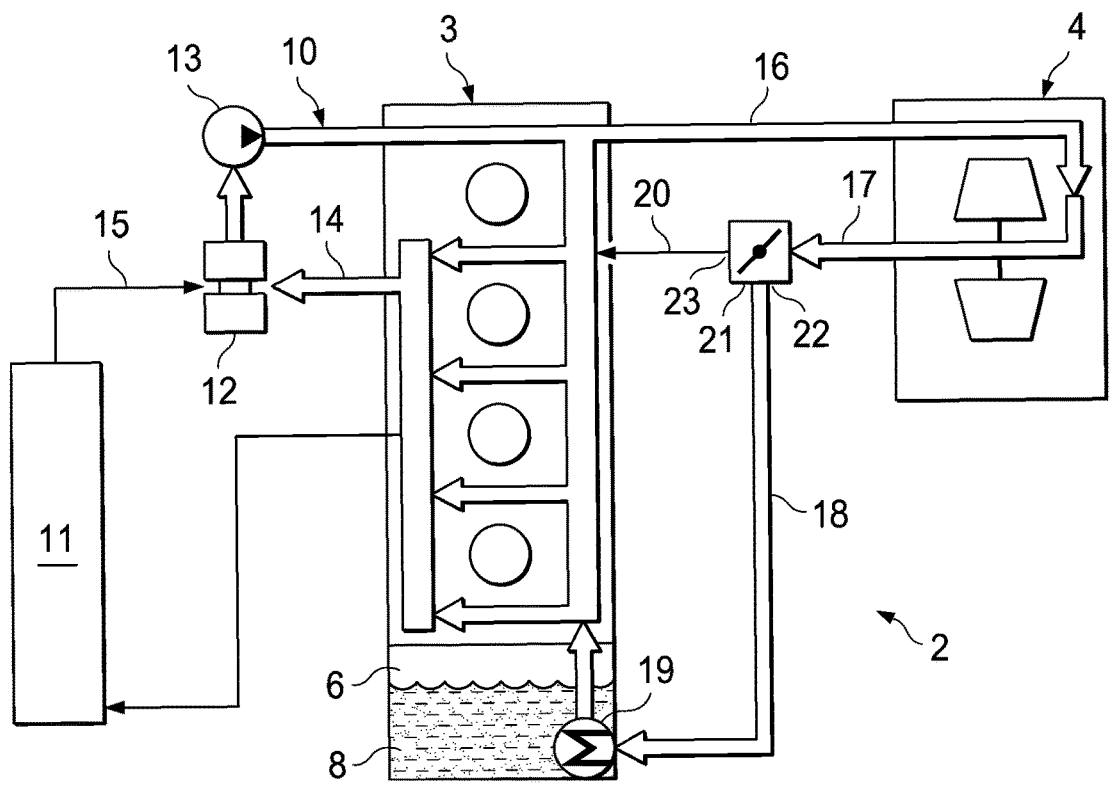
FIG. 2 shows a schematic illustration of an exemplary embodiment of the cooling device with an oil preheating line and a controllable discharge valve according to the teachings of the present disclosure.

FIG. 2 shows an exemplary embodiment of the cooling device 2. The internal combustion engine 3 with the engine oil container 6 is shown. The engine oil 8 is situated in the engine oil container 6. The internal combustion engine 3 is liquid-cooled by a coolant 10. The coolant 10 can be designed as cooling water or as a liquid in many other different forms, for example.

In some embodiments, the motor vehicle 1 comprises a radiator 11, a mapped control valve 12, and a coolant pump 13. The radiator 11 may be a finned radiator and function as a heat sink. By means of the radiator 11, heat is released from the coolant 10 to the air surrounding the radiator 11 or the motor vehicle 1, for example.

By means of the mapped control valve 12, a small cooling circuit 14 and a large cooling circuit 15 are possible. To accelerate the heating of the coolant 10 after cold starting, the coolant 10 can be conveyed exclusively in the small cooling circuit 14 by means of the mapped control valve 12. In the small cooling circuit 14, the coolant 10 does not flow through the radiator 11 and therefore warms up more quickly. Once the coolant 10 has then reached the desired operating-medium temperature, the mapped control valve 12 can be switched in such a way that the coolant 10 is also passed through the large cooling circuit 15 or exclusively through said circuit.

By means of the coolant pump 13, the coolant 10 is conveyed through the internal combustion engine 3, the turbocharger 4 and the radiator 11. Also shown is the turbocharger 4, which has a coolant feed line 16 and a coolant discharge line 17. Via the coolant feed line 16, the coolant 10 is fed to the turbocharger 4. Via the coolant discharge line 17, the coolant 10 heated by the turbocharger 4 is discharged.

In some embodiments, the cooling device 2 has an oil preheating line 18 connected directly to the coolant discharge line 17 and a first heat exchanger unit 19. Here, the oil preheating line 18 can be of one-part design or of multi-part design. The oil preheating line 18 is preferably designed in such a way that the coolant 10 is conveyed over the shortest path from the turbocharger 4 to the first heat exchanger unit 19. The oil preheating line 18 may include a hose or pipe or merely as a passage or a hole in the engine block, for example.

The first heat exchanger unit 19 is arranged at least partially in the engine oil container 6. In some embodiments, the first heat exchanger unit 19 may be arranged fully in the engine oil container 6. However, the first heat exchanger unit 19 is at least arranged partially in the engine oil container 6 or on the engine oil container 6 in such a way that thermal energy can be transferred from the coolant 10 to the engine oil 8. Thus, the oil preheating line 18 makes it possible to feed the coolant 10 heated by the turbocharger 4 to the first heat exchanger unit 19 and thereby to heat the engine oil 8, in particular during a cold starting phase of the motor vehicle 1.

In the case of known cooling devices, the coolant 10 is usually conveyed from the turbocharger 4 to the internal combustion engine 3 exclusively via an engine cooling line 20 connected to the coolant discharge line 17. In the case of known cooling devices, the heat released to the coolant 10 by the turbocharger 4 is not used deliberately or purposefully to heat the engine oil 8 by means of the first heat exchanger unit 19.

In some embodiments, the cooling device 2 has a controllable discharge valve 21. The discharge valve 21 is connected to the coolant discharge line 17 and has a first valve outlet 22, which is connected directly to the oil preheating line 18. Moreover, the discharge valve 21 has a second valve outlet 23, which is connected directly to the engine cooling line 20. Thus, after having passed through the turbocharger 4, the coolant 10 flows via the coolant discharge line 17 into the discharge valve 21 and, depending on the activation of the discharge valve 21, flows into the first valve outlet 22 and thus into the oil preheating line 18 and/or into the second valve outlet 23 and thus into the engine cooling line 20.

The discharge valve 21 can be controlled in such a way that all the coolant 10 is passed exclusively through the first valve outlet 22 or exclusively through the second valve outlet 23 or, alternatively, that the coolant 10 is passed simultaneously through the first valve outlet 22 and the second valve outlet 23.

Figure 3:
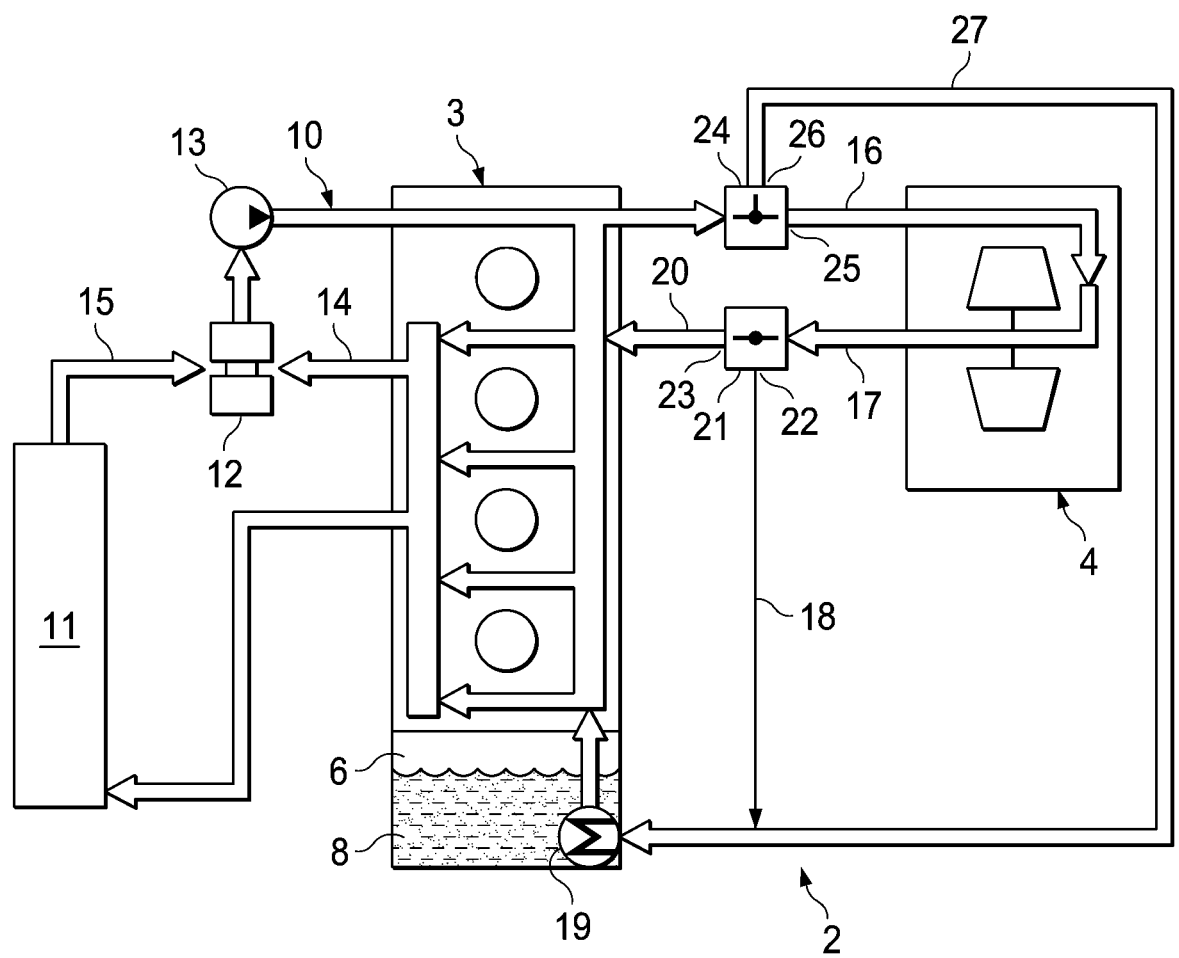
FIG. 3 shows a schematic illustration of another embodiment of the cooling device with a feed valve and a turbocharger bypass line according to the teachings of the present disclosure.

FIG. 3 shows another exemplary embodiment of the cooling device 2. The exemplary embodiment is similar in design to the exemplary embodiment in FIG. 2 but a feed valve 24 is additionally arranged on the coolant feed line 16. The feed valve 24 has a first valve outlet 25, which is connected directly to the coolant feed line 16. Furthermore, the feed valve 24 has a second valve outlet 26, which is connected directly to a turbocharger bypass line 27. In this case, the coolant 10 comes from the coolant pump 13 and is conveyed through the first valve outlet 25 and/or through the second valve outlet 26 depending on the activation of the feed valve 24.

In some embodiments, the coolant 10 may be passed continuously through the first valve outlet 25 in order to allow cooling of the turbocharger 4. The coolant 10 may be passed through the second valve outlet 26 if the engine oil 8 is to be cooled and, for this purpose, cold coolant 10, which has not passed through the turbocharger 4 and thus has not been heated by the turbocharger 4, is fed to the first heat exchanger unit 19 and passed through the first heat exchanger unit 19. In this case, the discharge valve 21 is set in such a way that the first valve outlet 22 is closed and only the second valve outlet 23 is open, with the result that no warm coolant passes via the oil preheating line 18 to the first heat exchanger unit 19.

Figure 4:
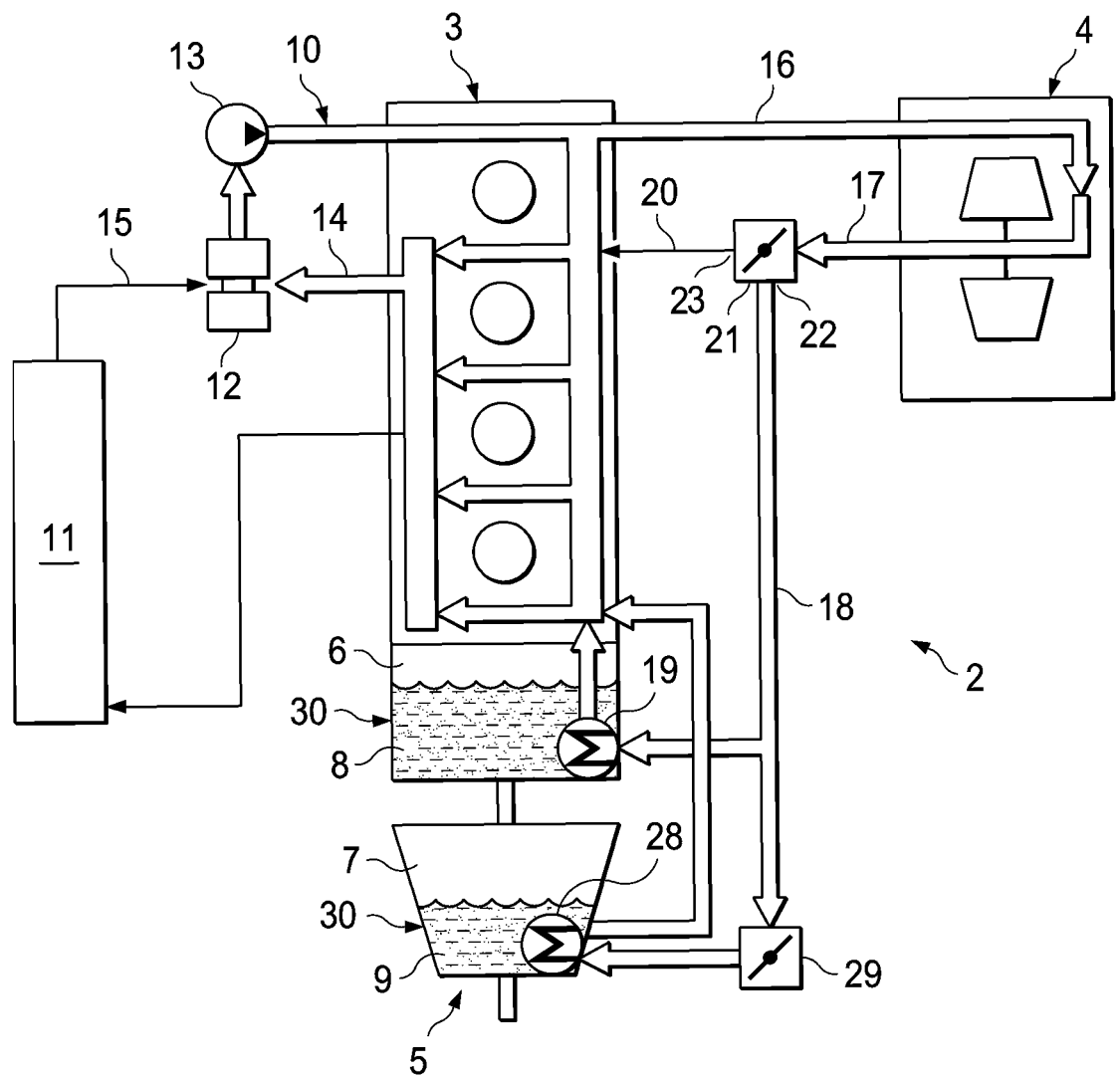
FIG. 4 shows a schematic illustration of another embodiment of the cooling device, by means of which oil in an engine oil container and oil in a transmission oil container are cooled according to the teachings of the present disclosure.

FIG. 4 shows another exemplary embodiment of the cooling device 2, which is similar in design to the exemplary embodiment in FIG. 2. However, the exemplary embodiment has a second heat exchanger unit 28, which is arranged at least partially in the transmission oil container 7. The transmission oil 9 is present in the transmission oil container 7. The transmission oil 9 and the second heat exchanger unit 28 are arranged in the transmission oil container in such a way that a thermal energy exchange to the transmission oil 9 is possible from the coolant 10 passed through the second heat exchanger unit 28.

In some embodiments, the second heat exchanger unit 28 is connected to the oil preheating line 18, like the first heat exchanger unit 19. In some embodiments, both the engine oil 8 and the transmission oil 9 can be heated or preheated by the thermal energy of the turbocharger 4 by means of the coolant 10.

In some embodiments, the cooling device 2 has a control valve 29, by means of which the oil preheating line 18 is connected to the second heat exchanger unit 28. By means of the control valve 29, a flow rate of the coolant 10 which is passed to the second heat exchanger unit 28 is subjected to open-loop and/or closed-loop control.

In some embodiments, the cooling device 2 includes only the second heat exchanger unit 28 and not the first heat exchanger unit 19. The first heat exchanger unit 19 can be identical or different in design to the second heat exchanger unit 28.

Some embodiments include a method wherein the coolant 10 is passed at least partially through the turbocharger 4 and heated there. The heated coolant 10 is passed to the engine oil and/or to the transmission oil 9 in order to preheat the respective oil or to release heat to the respective oil.

In some embodiments, a current oil temperature value 30 of the engine oil 8 and/or of the transmission oil 9 may be determined, e.g. by means of a thermostat of the motor vehicle 1, and the discharge valve 21 may be controlled in accordance with the oil temperature value 30. Thus, the discharge valve 21 can be controlled in such a way, for example, that only a small portion of the coolant 10 or even no coolant 10 is passed via the oil preheating line 18 if an engine oil temperature value or a transmission oil temperature value exceeds a limit value.

In some embodiments, the feed valve 24 can also be controlled in accordance with the oil temperature value 30, for example. Thus, the feed valve 24 can be set in such a way, for example, that the coolant 10 is passed at least partially via the turbocharger bypass line 27 if the oil temperature is higher than an oil temperature limit value and the engine oil 8 and/or the transmission oil 9 is cooled by the coolant 10 diverted ahead of the turbocharger 4.

In some embodiments, no steam bubbles form in the coolant 10 in the oil preheating line 18. Particularly at full load, the engine oil 8 and/or the transmission oil 9 can reach a higher temperature than the coolant 10 in the oil preheating line 18, and there can be a heat transfer from the engine oil 8 and/or the transmission oil 9 to the coolant 10. To counteract this, the cooling device 2 may be operated at an excess pressure of up to 2 bar. This avoids cavitation in the engine block of the combustion block 3, and the boiling point of the coolant 10 is then reached only at 130° C., for example, and not at 100° C. However, the cooling device 2 can also be operated with an excess pressure of more than 2 bar.

In some embodiments, the following further procedures to counteract the formation of steam bubbles in the oil preheating line 18 may be employed. An excess pressure in the oil preheating line 18 may be dissipated via a pressure relief valve in an expansion tank, for example. In some embodiments, the oil preheating line 18 releases energy to the environment by radiation, ensuring that the temperature of the coolant 10 in the oil preheating line 18 remains below the boiling point. In some embodiments, the cooling device 2 includes a separate oil cooler.

As a supplementary or alternative measure, it is also possible for a small mass flow of the coolant 10 to flow via the oil preheating line 18 as a "creep flow" and thereby to prevent overheating of the oil preheating line 18. It is also possible for the first heat exchanger unit 19 and/or the second heat exchanger unit 28 to be used to cool the engine oil 8 and/or the transmission oil 9. By preheating the engine oil 8 and/or the transmission oil 9 by means of the coolant 10 passed through the oil preheating line 18, $CO_2$ emissions of the motor vehicle 1 can be reduced.

Figure 5:
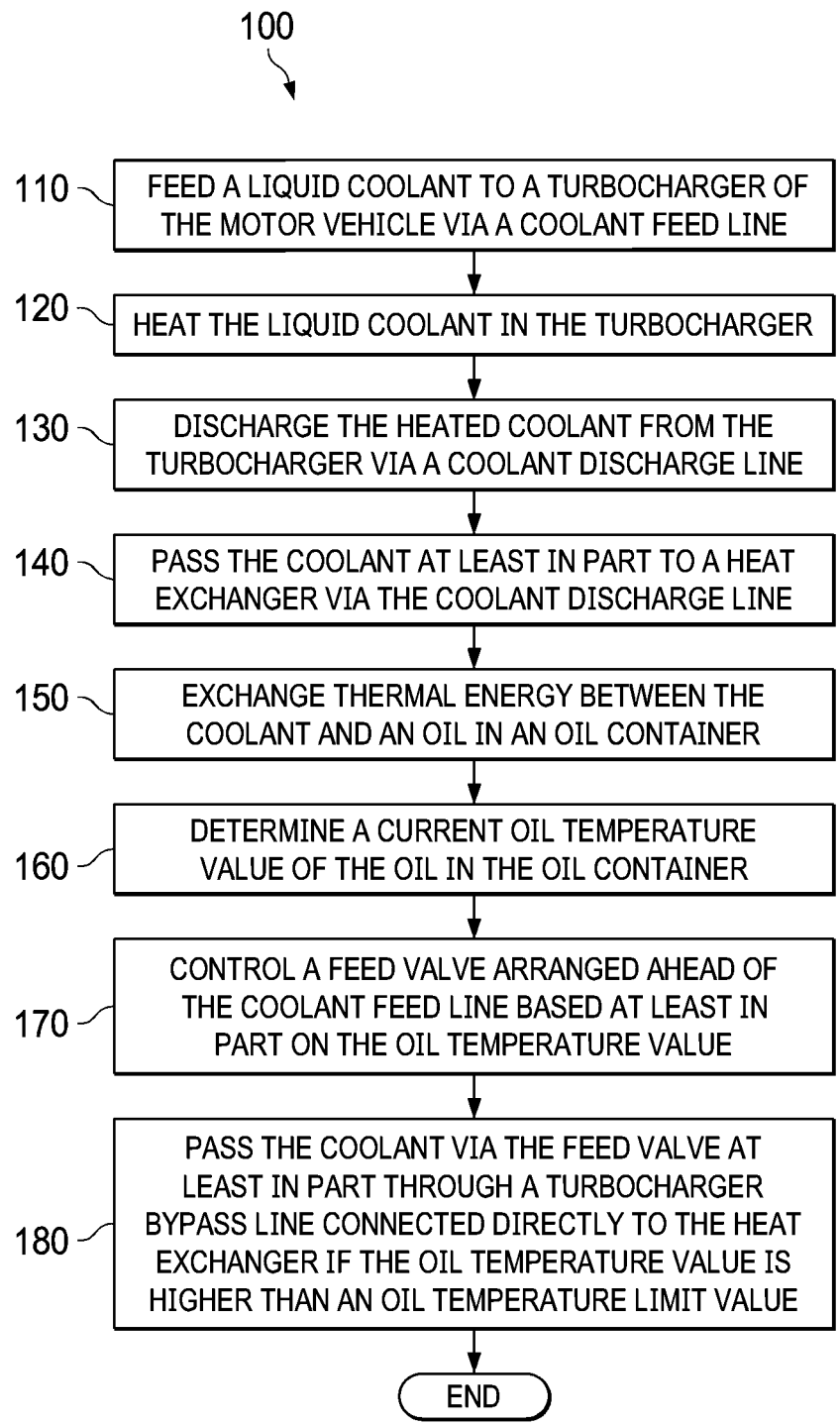
FIG. 5 shows a flowchart illustrating an example method incorporating teachings of the present disclosure.

FIG. 5 shows a flowchart illustrating an example method 100 incorporating teachings of the present disclosure. In some embodiments, such as that shown in method 100, Step 110 includes feeding a liquid coolant to a turbocharger of the motor vehicle via a coolant feed line. Step 120 may include heating the liquid coolant in the turbocharger. Step 130 may include discharging the heated coolant from the turbocharger via a coolant discharge line. Step 140 may include passing the coolant at least in part to a heat exchanger via the coolant discharge line. Step 150 may include exchanging thermal energy between the coolant and an oil in an oil container. Step 160 may include determining a current oil temperature value of the oil in the oil container. Step 170 may include controlling a feed valve arranged ahead of the coolant feed line based at least in part on the oil temperature value. Step 180 may include passing the coolant via the feed valve at least in part through a turbocharger bypass line connected directly to the heat exchanger if the oil temperature value is higher than an oil temperature limit value. After Step 180, method 100 may end.

LIST OF REFERENCE SIGNS

1 Motor vehicle
2 Cooling device
3 Internal combustion engine
4 Turbocharger
5 Vehicle transmission
6 Engine oil container
7 Transmission oil container
8 Engine oil
9 Transmission oil
10 Coolant
11 Radiator
12 Mapped control valve
13 Coolant pump
14 Small cooling circuit
15 Large cooling circuit
16 Coolant feed line
17 Coolant discharge line
18 Oil preheating line
19 First heat exchanger unit
20 Engine cooling line
21 Discharge valve
22 First valve outlet of the discharge valve
23 Second valve outlet of the discharge valve
24 Feed valve
25 First valve outlet of the feed valve
26 Second valve outlet of the feed valve
27 Turbocharger bypass line
28 Second heat exchanger unit
29 Control valve
30 Oil temperature value

The invention claimed is:

1. A cooling device for a motor vehicle, the cooling device comprising:
  a liquid-cooled turbocharger arranged on an internal combustion engine;
  a coolant feed line;
  a coolant discharge line; and
  a heat exchanger arranged at least partially within an oil container;
  wherein the coolant discharge line is connected by an oil preheating line to the heat exchanger;
  wherein a first valve outlet of a feed valve is connected directly to the coolant feed line; and
  a second valve outlet of the feed valve is connected directly to a turbocharger bypass line connected to the heat exchanger.

2. The cooling device as claimed in claim 1, wherein the oil container comprises an engine oil container arranged on the internal combustion engine.

3. The cooling device as claimed in claim 1, wherein the oil container comprises a transmission oil container arranged on a vehicle transmission of the motor vehicle.

4. The cooling device as claimed in claim 1, wherein the oil preheating line is connected directly to the coolant discharge line by a first valve outlet of a controllable discharge valve; and
  the coolant discharge line is connected directly to an engine cooling line of the internal combustion engine by a second valve outlet of the controllable discharge valve.

5. The cooling device as claimed in claim 1, wherein the heat exchanger is connected to the oil preheating line by a control valve controlling a flow rate of a coolant flowing through the oil preheating line.

6. A motor vehicle comprising:
an internal combustion engine;
a liquid-cooled turbocharger arranged on an internal combustion engine;
a coolant feed line;
a coolant discharge line; and
a heat exchanger arranged at least partially within an oil container;
wherein the coolant discharge line is connected by an oil preheating line to the heat exchanger;
wherein a first valve outlet of a feed valve is connected directly to the coolant feed line; and
a second valve outlet of the feed valve is connected directly to a turbocharger bypass line connected to the heat exchanger.

7. A method for operating a motor vehicle, the method comprising:
feeding a liquid coolant to a turbocharger of the motor vehicle via a coolant feed line;
heating the liquid coolant in the turbocharger;
discharging the heated coolant from the turbocharger via a coolant discharge line;
passing the coolant at least in part to a heat exchanger via the coolant discharge line;
exchanging thermal energy between the coolant and an oil in an oil container;
determining a current oil temperature value of the oil in the oil container;
controlling a feed valve arranged ahead of the coolant feed line based at least in part on the oil temperature value; and
passing the coolant via the feed valve at least in part through a turbocharger bypass line connected directly to the heat exchanger if the oil temperature value is higher than an oil temperature limit value.

8. The method as claimed in claim 7, further comprising:
determining a current oil temperature value of the oil in the oil container; and
controlling a discharge valve arranged between the coolant discharge line and an oil preheating line based at least in part on the oil temperature value to regulate an oil quantity flowing through the discharge valve.

* * * * *